(12) United States Patent
Espinasse

(10) Patent No.: US 8,307,492 B2
(45) Date of Patent: Nov. 13, 2012

(54) LINKING DEVICE INCLUDING TURNING LIMITATION MEANS

(75) Inventor: Philippe Espinasse, Coudes (FR)

(73) Assignee: Valeo Systèmes d'Essuyage, La Verriere (FR)

( * ) Notice: Subject to any disclaimer, the term of this patent is extended or adjusted under 35 U.S.C. 154(b) by 0 days.

(21) Appl. No.: 12/602,367

(22) PCT Filed: May 5, 2008

(86) PCT No.: PCT/EP2008/055479
§ 371 (c)(1),
(2), (4) Date: May 28, 2010

(87) PCT Pub. No.: WO2008/148615
PCT Pub. Date: Dec. 11, 2008

(65) Prior Publication Data
US 2010/0275402 A1    Nov. 4, 2010

(30) Foreign Application Priority Data

May 31, 2007  (FR) ..................................... 07 03848

(51) Int. Cl.
*B60S 1/40*    (2006.01)

(52) U.S. Cl. .................................. 15/250.32; 15/250.43

(58) Field of Classification Search ............... 15/250.32, 15/250.351, 250.43, 250.44, 250.33
See application file for complete search history.

(56) References Cited

U.S. PATENT DOCUMENTS

| | | | | |
|---|---|---|---|---|
| 3,163,877 A | * | 1/1965 | Wubbe ........................ | 15/250.32 |
| 3,928,887 A | * | 12/1975 | Lopez et al. ................ | 15/250.32 |
| 4,598,438 A | * | 7/1986 | Egner-Walter et al. ..... | 15/250.32 |
| 6,353,962 B1 | * | 3/2002 | Matsumoto et al. ........ | 15/250.32 |
| 2007/0094833 A1 | | 5/2007 | Poton | |

FOREIGN PATENT DOCUMENTS

| FR | 2 801 551 A1 | 6/2001 |
|---|---|---|
| FR | 2866298 A1 | 8/2005 |
| FR | 2871127 A1 | 12/2005 |
| JP | 03-273961 | * 12/1991 |

OTHER PUBLICATIONS

International Search Report w/translation from PCT/EP2008/055479 dated Aug. 28, 2008 (4 pages).
Office Action issued in the corresponding European Application No. 08 759 416.4 dated Dec. 3, 2010 and English translation thereof (8 pages).

* cited by examiner

*Primary Examiner* — Gary Graham
(74) *Attorney, Agent, or Firm* — Osha • Liang LLP

(57) ABSTRACT

The invention provides a device for linking (10) a windscreen wiper blade with an arm driving the wiper blade into a wiping movement, which is connected to a connector (12) for the joint-mounting of the wiper blade with the arm about a transversal axis (A),
the linking device (10) being fastened to the wiper blade and being mobile for pivoting with respect to the connector (12) about said transversal axis (A),
characterized in that the linking device (10) includes a portion (30) able to abut against a component (24) of the connector (12) for limiting the amplitude of the pivoting of the linking device (10) with respect to the connector (12) about the transversal axis (A).

6 Claims, 4 Drawing Sheets

Wiper Blade (1)

LINKING DEVICE INCLUDING TURNING LIMITATION MEANS

The invention provides a device for linking a windscreen wiper blade with a driving arm.

The invention more particularly provides a device for linking a windscreen wiper blade, which is connected to a connector for joint-mounting the wiper blade with an arm about a transversal axis, the linking device being fastened to the wiper blade and being mobile for pivoting with respect to the connector about said transversal axis.

According to a general embodiment, the linking device is fastened to the wiper blade and it is mounted on the mounting connector while laterally covering the connector.

Besides, in order to facilitate the mounting on and the dismounting of the wiper blade from the arm, the linking device is designed for being able to pivot about the jointing transversal axis, according to an amplitude greater than the travel of the wiper blade during its wiping movement on the glass panel.

However, the jointing of the wiper blade with respect to the arm allows a high pivoting amplitude, so that it is possible for the wiper blade to be turned with respect to the glass panel, i.e. the linking device is able to come into contact with the glass panel, which entails the risk of deterioration for the glass.

The object of the invention is to provide a linking device which prevents the wiper blade to be turned with respect to the glass panel.

For this purpose, the invention provides a linking device such as previously described, characterised in that the linking device includes a portion able to abut against a component of the connector for limiting the amplitude of pivoting of the linking device with respect to the connector about the transversal axis A.

According to other characteristics of the invention, either taken one by one or in combination:
- the linking device includes at least a rib protruding upwards from a horizontal bottom of the linking device and which is able to abut against the longitudinal lugs positioned at the front end of the connector;
- the rib is positioned on the bottom of the linking device so that the linking device is in an angular position enabling the release of the linking device from the connector when the rib is abutting against the lugs;
- the linking device includes a transversal shaft coaxial to the jointing transversal axis A, which is mounted by means of an elastic snapping on a body of the connector for the jointing of the linking device with the connector;
- the rib is longitudinally shifted frontwards with respect to the transversal shaft;
- the rib is longitudinally shifted backwards with respect to the transversal shaft;
- the bottom includes two ribs arranged symmetrically with respect to a vertical longitudinal axis in the middle of the linking device, each rib being associated with a longitudinal lug of the connector.

Other characteristics and advantages of the invention will appear upon reading the following detailed description, for the understanding of which reference will be made to the annexed Figures in which.

In the description of the invention, the vertical, longitudinal and transversal orientations according to the V, L, T system mentioned in the Figures will be non-limitatively adopted.

Figure 1:
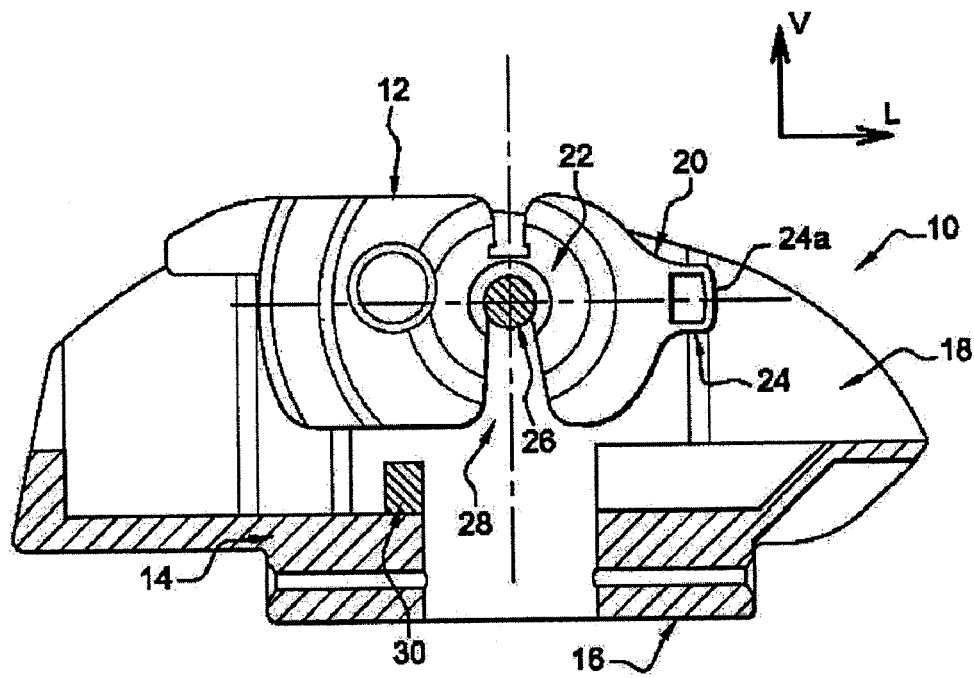
FIG. 1 is a cross-section along a vertical longitudinal plane of the linking device according to the invention, which is mounted on the linking connector.

The front-to-back orientation will be the longitudinal left-to-right direction with reference to FIG. 1.

In the following description, identical, similar or analogous elements will be designated by the same reference numbers.

The Figures show a linking device 10 intended to be mounted on a wiper blade (1) and which is intended to be connected to a connector 12 for the joint-mounting of the wiper blade on one end of a driving arm (not shown) about a transversal axis A.

The linking device 10 includes a horizontal bottom 14 which rests on an upper back (not shown) of the wiper blade (1), lower claws 16 for fastening the linking device 10 to the wiper blade, which extend vertically downwards from the longitudinal edges of the transversal end of the bottom 14 and lateral wings 18 which extend vertically upwards from the longitudinal edges of the transversal end of the bottom 14.

The wings 18 are transversally arranged on either side of the connector 12 for transversally locking the wiper blade (1) on the arm when the linking device 10 is mounted on the connector 12.

The connector 12 is designed for being mounted on a front longitudinal end of the arm which has the shape of a bent backwards U.

The connector 12 includes two lateral walls 20 having a vertical longitudinal orientation, between which the end of the arm is accommodated and a central body 22, which is accommodated in the end of the arm, between the branches of the U which connects the side walls 20 together.

Each side wall 20 is longitudinally extended frontwards by a lug 24, with the free front longitudinal end 24a of each lug 24 being transversally bent for resting against a portion of the front end of the arm. The lugs 24 make it possible to longitudinally lock the connector 12 in the mounted position on the end of the arm.

The jointing of the linking device 10, with respect to the connector 12, and consequently, the jointing of the wiper blade with respect to the arm, is obtained by means of a transversal shaft 26 for the coaxial jointing with the transversal axis A, which connects both wings 18 of the linking device 10.

The transversal shaft 26 is accommodated in the central body 22 of the connector 12, by means of an elastic snapping through an opening 28 of the connector 12.

According to the invention, the linking device 10 includes a portion able to abut against a component of the connector 12 for limiting the amplitude of pivoting of the linking device 10 with respect to the connector 12.

According to the invention, such portion of the linking device 10 consists of a rib 30 directed mainly transversally, which protrudes upwards with respect to the bottom 14 of the linking device 10.

Figure 4:
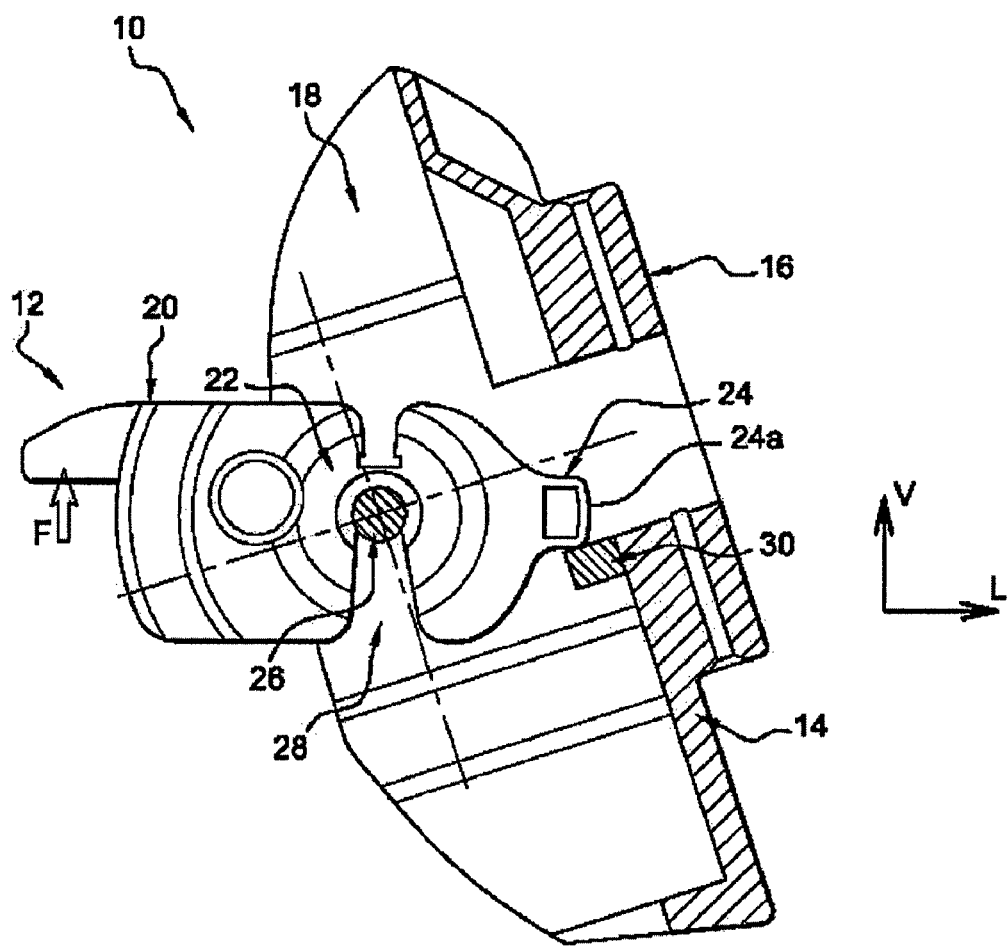
FIG. 4 is a view similar to that of FIG. 2, wherein the linking device is in an abutting angular position with respect to the connector.

As can be seen in FIG. 4, the rib 30 is designed so as to abut against the longitudinal lugs 24 of the connector 12, when the linking device 10 is in a determined position with respect to the connector 12, so as to prevent any pivoting of the linking device 10 beyond this determined positioned shown in FIG. 4.

Figure 3:
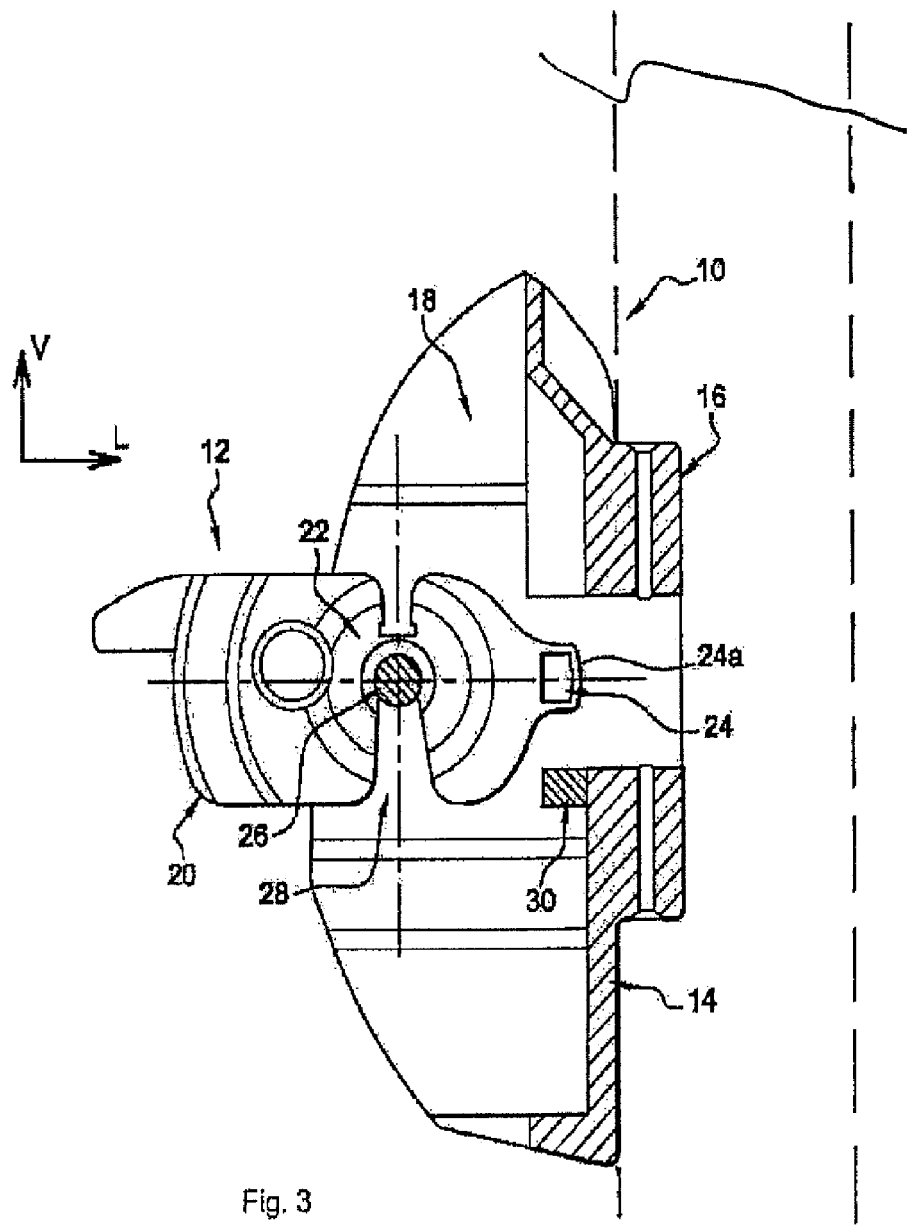
FIG. 3 is a view similar to that of FIG. 2 wherein the linking device is pivoted with respect to the connector, by an angle of 90 degrees.

In FIGS. 1, 3 and 4, various angular positions of the linking device 10 with respect to the connector 12 are shown.

In the angular position shown in FIG. 1, the linking device 10 is directed mainly horizontally, such angular position corresponding to a wiping position in which the wiper blade is resting on the glass panel.

In the angular position shown in FIG. 3, the linking device 10 is positioned at right angles with respect to the angular position shown in FIG. 1.

Such intermediate position makes it possible to release the linking device 10 from the connector 12 through a globally vertical motion downwards of the linking device 10 with respect to the connector 12.

The angular position shown in FIG. 4 is the abutting position of the linking device 10 beyond which the linking device 10 cannot pivot.

In such a position, the rib 30 is resting upwards against the free end of each lug 24.

In this case, the abutting position of the linking device 10 is beyond the intermediate position shown in FIG. 3, i.e. the linking device 10 can pivot with respect to the connector according to an angle greater than 90 degrees.

For this purpose, the rib 30 is positioned longitudinally on the bottom 14 of the linking device 10 so that it is shifted backwards with respect to the shaft 26.

However, it should be understood that the invention is not limited to such embodiment and that the rib 30 may be positioned on the bottom 14 so as to allow a rotation with a greater amplitude or a smaller amplitude.

Figure 5:
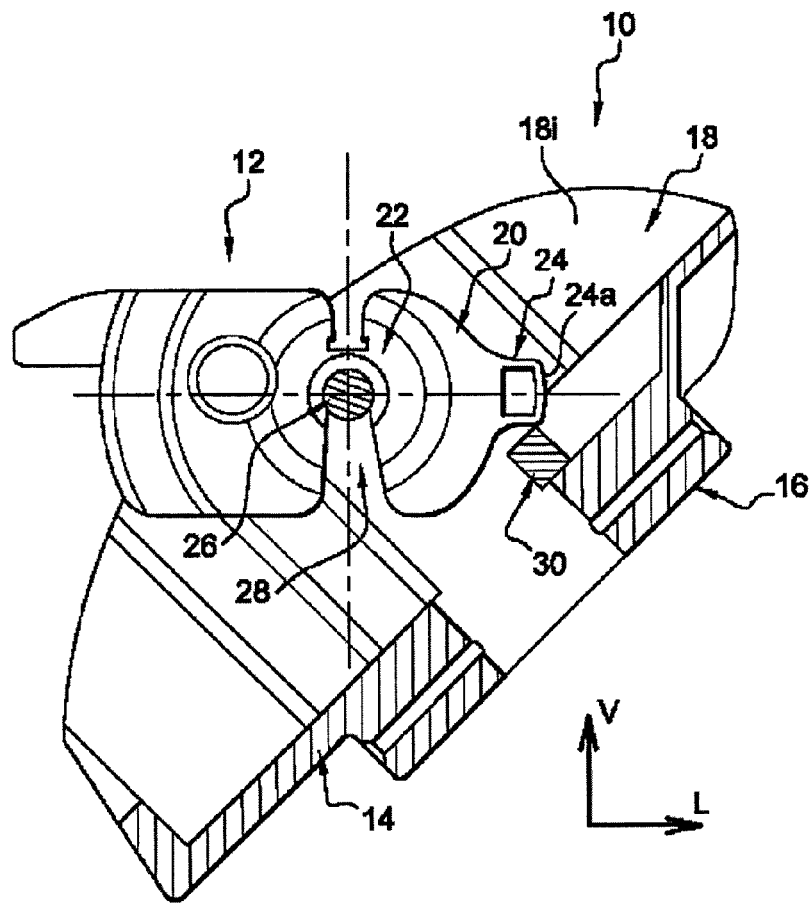
FIG. 5 is a view similar to that of FIG. 4, wherein the abutting position of the linking device corresponds to a pivoting angle smaller than 90 degrees.
Figure 6:
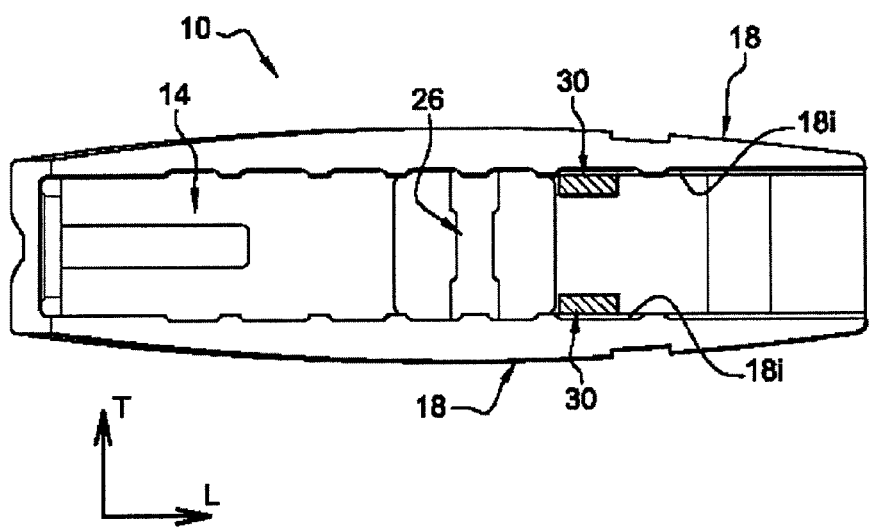
FIG. 6 is a view similar to that of FIG. 2, showing an alternative embodiment of the rib of the invention.

For example, as can be seen in FIGS. 5 and 6, the rib 30 is longitudinally positioned on the bottom of the linking device 10 so that it is shifted backwards with respect to the shaft 26.

Thus, when the linking device 10 is in its abutting position shown in FIG. 5, the wiping rib (not shown) faces the glass panel, which prevents a rigid component of the wiper blade from coming in contact with the glass panel.

In addition, in this abutting position, when the wiper blade comes in contact with the glass panel, it automatically pivots towards the wiping position shown in FIG. 1, without the user having to cause an initial rotation of the wiper blade and the linking device 10 with respect to the connector 12.

According to another aspect of the linking device 10 according to the invention, the rib 30 forms a support of the connector 12 against the linking device in order to facilitate the release of the linking device 10 from the connector 12.

As a matter of fact, the transversal shaft 26 is mounted in the body 22 of the connector by means of an elastic snapping through the opening 28 of the connector.

Thus, it is possible to take the transversal shaft 26 out of the body 22 by using the resting of the rib 30 on the front lugs 24 and by exerting on the rear part of the connector 12 a force directed upwards as shown by the arrow F in FIG. 4. It is then possible to take the transversal shaft 26 out of the body 22.

The connector 12 is then able to move upwards with respect to the linking device 10 for enabling the transversal shaft 26 to come out of the body 22 through the opening 28 of the connector 12.

Such an action on the connector 12 is relatively simple for a user during the replacing of a worn wiper blade by a new one.

Figure 2:
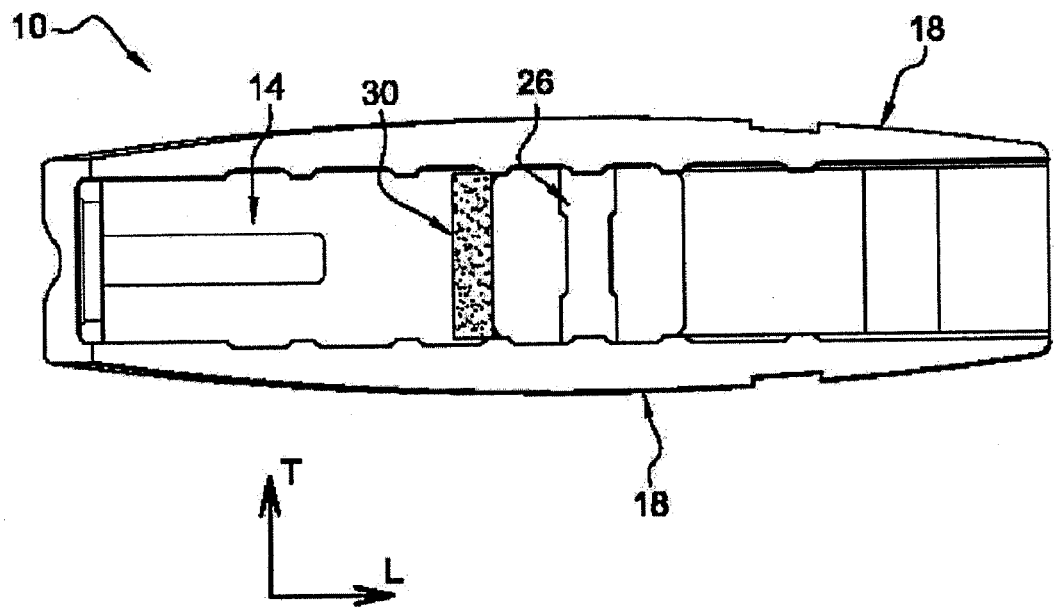
FIG. 2 is a top view of the linking device according to the invention.

A first embodiment of the invention is shown in FIG. 2, wherein the linking device 10 includes only one rib 30, which transversally extends on the whole width of the linking device 10, i.e. the rib 30 connects both wings 18 of the linking device 10.

Another embodiment of the invention is shown in FIG. 6, wherein the linking device 10 includes two ribs 30 transversally distributed on either side of the body 14 of the linking device 10.

Each rib 30 transversally extends towards the inside of the linking device 10 from an internal vertical longitudinal face 18i of a wing 18, towards the other wing 18.

Each rib 30 is associated with a lug 24 of the connector 12 so that a lug 24 abuts against the end 24a of the associated lug 24.

This makes it possible to reduce the amount of material used for making the abutment of the linking device 10 against the connector 12 and consequently, to reduce the weight and the manufacturing cost of the linking device 10.

The invention claimed is:

1. A linking device for linking a windscreen wiper blade with an arm for driving the wiper blade into a wiping movement, which is connected to a connector for joint-mounting the wiper blade with the arm about a transversal axis, wherein
   the linking device is fastened to the wiper blade and is mobile for pivoting with respect to the connector about said transversal axis,
   the linking device includes a portion configured to abut against a component of the connector for limiting a pivoting amplitude of the linking device with respect to the connector about the transversal axis, and
   the linking device includes at least one rib protruding upwards from a horizontal bottom portion of the linking device, the at least one rib being configured to abut against longitudinal lugs positioned at a front end of the connector, and the transversal axis being above the horizontal bottom portion of the linking device.

2. The linking device according to claim 1, wherein the at least one rib is positioned on the bottom of the linking device so that the linking device is in an angular position, allowing the release of the linking device from the connector when the at least one rib is abutting against the longitudinal lugs.

3. The linking device according to claim 2, further comprising a transversal shaft coaxial with the jointing transversal axis, wherein the transversal shaft is mounted by an elastic snapping into a body of the connector for joining the linking device with the connector.

4. The linking device according to claim 3, wherein the at least one rib is longitudinally shifted frontwards with respect to the transversal shaft.

5. The linking device according to claim 3, wherein the at least one rib is longitudinally shifted backwards with respect to the transversal shaft.

6. The linking device according to claim 1, wherein the bottom has two ribs arranged symmetrically with respect to a middle vertical longitudinal axis of the linking device, wherein each rib is associated with a longitudinal lug of the connector.

* * * * *